US012077944B2

(12) United States Patent
Udagawa et al.

(10) Patent No.: US 12,077,944 B2
(45) Date of Patent: Sep. 3, 2024

(54) CONSTRUCTION MACHINE

(71) Applicant: Hitachi Construction Machinery Co., Ltd., Tokyo (JP)

(72) Inventors: Tsutomu Udagawa, Tsukuba (JP); Junji Yamamoto, Kasumigaura (JP); Shigeyuki Sakurai, Tsukuba (JP); Yukihito Suzuki, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 325 days.

(21) Appl. No.: 17/638,247

(22) PCT Filed: Oct. 13, 2020

(86) PCT No.: PCT/JP2020/038671
§ 371 (c)(1),
(2) Date: Feb. 25, 2022

(87) PCT Pub. No.: WO2021/124658
PCT Pub. Date: Jun. 24, 2021

(65) Prior Publication Data

US 2022/0298755 A1 Sep. 22, 2022

(30) Foreign Application Priority Data

Dec. 16, 2019 (JP) ................................ 2019-226756

(51) Int. Cl.
*E02F 9/22* (2006.01)
*F15B 11/17* (2006.01)

(52) U.S. Cl.
CPC .......... *E02F 9/2296* (2013.01); *E02F 9/2235* (2013.01); *E02F 9/2267* (2013.01);
(Continued)

(58) Field of Classification Search
CPC ..... E02F 9/2296; E02F 9/2235; E02F 9/2267; E02F 9/2285; E02F 9/2292; E02F 9/226;
(Continued)

(56) References Cited

U.S. PATENT DOCUMENTS

2010/0115938 A1* 5/2010 Kobata ................. F15B 11/042
60/459
2013/0342340 A1* 12/2013 Nishikawa ............ E02F 9/2066
340/439

(Continued)

FOREIGN PATENT DOCUMENTS

JP 2000-46015 A 2/2000
JP 3857361 B2 12/2006
JP 2019-49204 A 3/2019

OTHER PUBLICATIONS

International Preliminary Report on Patentability (PCT/IB/338 & PCT/IB/373) issued in PCT Application No. PCT/JP2020/038671 dated May 17, 2022, including English translation of document C2 (Japanese-language Written Opinion (PCT/ISA/237), filed on Feb. 25, 2022) (six (6) pages).

(Continued)

*Primary Examiner* — Abdalla A Khaled
(74) *Attorney, Agent, or Firm* — Crowell & Moring LLP

(57) ABSTRACT

There is provided a construction machine that is capable of measuring a minute leakage flow rate of a one-sided tilting variable displacement hydraulic pump. The construction machine includes a pressure sensor that detects a pressure of a hydraulic pump, a bleed-off adjusting device that is enabled to adjust a bleed-off flow rate of the hydraulic pump, and an input device that gives an instruction for measurement of a leakage flow rate of the hydraulic pump. The controller is configured to measure, when the controller determines that the operation device is in a non-operated state and when a measuring command is inputted from the (Continued)

input device, a pressure of the hydraulic pump while changing a control command value for the bleed-off adjusting device in a state in which a flow rate of the hydraulic pump is maintained, and calculate the leakage flow rate of the hydraulic pump on the basis of the control command value for the bleed-off adjusting device at the time that the pressure of the hydraulic pump is stabilized at a predetermined pressure.

6 Claims, 10 Drawing Sheets

(52) U.S. Cl.
CPC .......... *E02F 9/2285* (2013.01); *E02F 9/2292* (2013.01); *F15B 11/17* (2013.01); *F15B 2211/20546* (2013.01); *F15B 2211/20576* (2013.01)

(58) Field of Classification Search
CPC ..... E02F 3/32; E02F 9/26; F15B 11/17; F15B 2211/20546; F15B 2211/20576; F15B 20/005; F15B 2211/20523; F15B 21/045; F15B 2211/3116; F15B 2211/413; F15B 2211/41509; F15B 2211/41554; F15B 2211/426; F15B 19/002; F15B 2211/45; F15B 2211/455; F15B 2211/50518; F15B 2211/5157; F15B 2211/6309; F15B 2211/6343; F15B 2211/6346; F15B 2211/6651; F15B 2211/6652; F15B 2211/857; F15B 2211/8633; F15B 2211/87; F15B 19/005; F04B 49/10; F04B 49/12; F04B 51/00
See application file for complete search history.

(56) References Cited

U.S. PATENT DOCUMENTS

| | | | | |
|---|---|---|---|---|
| 2014/0046552 | A1* | 2/2014 | Tsuruga | E02F 9/2091 701/50 |
| 2014/0052350 | A1* | 2/2014 | Tsuruga | E02F 9/2296 701/50 |
| 2016/0175509 | A1* | 6/2016 | Planas | A61M 1/0209 137/15.01 |
| 2018/0030692 | A1* | 2/2018 | Kamoshita | F16H 61/4008 |
| 2018/0119713 | A1* | 5/2018 | Kloda | F04B 49/065 |
| 2018/0202130 | A1* | 7/2018 | Morimoto | E02F 9/265 |
| 2018/0299410 | A1* | 10/2018 | Merrill | G01N 5/02 |
| 2020/0158143 | A1* | 5/2020 | Kondo | E02F 9/22 |

OTHER PUBLICATIONS

International Search Report (PCT/ISA/210) issued in PCT Application No. PCT/JP2020/038671 dated Dec. 1, 2020 with English translation (five (5) pages).

Japanese-language Written Opinion (PCT/ISA/237) issued in PCT Application No. PCT/JP2020/038671 dated Dec. 1, 2020 (four (4) pages).

* cited by examiner

CONSTRUCTION MACHINE

TECHNICAL FIELD

The present invention relates to a construction machine such as a hydraulic excavator or a crane incorporating a one-sided tilting variable displacement hydraulic pump.

BACKGROUND ART

One method of diagnosing the failure of a hydraulic pump is known from Patent Document 1.

Patent Document 1 discloses a hydraulic pump failure diagnosing apparatus for a work machine. The work machine includes a plurality of variable displacement hydraulic pumps whose delivery rates are controlled by a regulator, a plurality of hydraulic actuators that are driven by a hydraulic fluid delivered by one or more of the variable displacement hydraulic pumps, a plurality of flow control valves that control the driving of the respective hydraulic actuators, and a line that connects one or more of the variable displacement hydraulic pumps to a tank through one or more of the flow control valves in a neutral position. The hydraulic pump failure diagnosing apparatus includes check valves associated with differential pressure sensors interposed individually between the variable displacement hydraulic pumps and the flow control valves, maximum delivery rate indicating means for indicating a maximum delivery rate of the variable displacement hydraulic pumps to the regulator while the variable displacement hydraulic pumps are being connected to the line, storage means for storing detected pressures from the check valves associated with differential pressure sensors with respect to the variable displacement hydraulic pumps that are delivering the maximum delivery rate indicated by the maximum delivery rate indicating means, and failure determining means for determining whether or not each of the variable displacement hydraulic pumps is favorable, on the basis of the detected pressures.

PRIOR ART DOCUMENT

Patent Document

Patent Document 1: JP-3857361-B

SUMMARY OF THE INVENTION

Problems to be Solved by the Invention

The hydraulic pump failure diagnosing apparatus disclosed in Patent Document 1 incorporates the check valves associated with differential pressure sensors. However, the check valves associated with differential pressure sensors fail to provide sufficient accuracy in a small flow rate range for the following reasons.

A check valve allows a fluid to flow therethrough in a forward direction and prevents the fluid from flowing therethrough in a reverse direction. The check valve remains closed unless the differential pressure thereacross exceeds a predetermined pressure (cracking pressure). When the differential pressure exceeds the cracking pressure, the check valve is opened. As the differential pressure increases, the opening degree of the check valve increases, allowing the fluid to flow at a higher flow rate. Since the flow rate through the check valve varies largely depending on the differential pressure, it is difficult to determine the flow rate with high accuracy from the differential pressure. FIG. 5 (characteristic diagram of a conversion map of pressures and flow rates) of Patent Document 1 illustrates such a situation. According to FIG. 5, inasmuch as the flow rate varies largely particularly in a range where the pressure (the differential pressure across the check valve) is low, the accuracy with which to convert and calculate a flow rate drops largely in a small flow rate range.

In order to increase the accuracy with which to convert and calculate a flow rate, it may be possible to reduce a change caused in the flow rate by the pressure, by reducing the amount of opening of the check valve. However, the check valve with the reduced amount of opening tends to cause a large pressure loss during normal operation other than diagnosis, resulting in an energy loss.

The present invention has been made in view of the above problems. It is an object of the present invention to provide a construction machine that is capable of measuring a minute leakage flow rate of a one-sided tilting variable displacement hydraulic pump.

Means for Solving the Problems

In order to achieve the above object, according to the present invention, there is provided a construction machine including a prime mover, a tank that stores a hydraulic fluid, a one-sided tilting variable displacement hydraulic pump that is driven by the prime mover and that delivers the hydraulic fluid drawn from the tank, a plurality of hydraulic actuators that are driven by the hydraulic fluid supplied from the hydraulic pump, an operation device that gives an instruction for operations of the plurality of hydraulic actuators, and a controller that controls a revolution speed of the prime mover and tilting the hydraulic pump. The construction machine includes a pressure sensor that detects a pressure of the hydraulic pump, a bleed-off adjusting device that is enabled to adjust a bleed-off flow rate of the hydraulic pump, and an input device that gives an instruction for measurement of a leakage flow rate of the first hydraulic pump. The controller is connected to the operation device, the pressure sensor, the bleed-off adjusting device, and the input device, and is programmed to determine an operated state of the operation device on the basis of an input signal from the operation device, convert a detected signal from the pressure sensor into a pressure value, and output a control signal based on a control command value to the bleed-off adjusting device. The controller is configured to, in a case where the controller determines that the operation device is in a non-operated state and where a measuring command is inputted from the input device, measure a pressure of the first hydraulic pump while changing the control command value for the first bleed-off adjusting device in a state in which a flow rate of the first hydraulic pump is maintained, and calculate the leakage flow rate of the hydraulic pump on the basis of the control command value for the bleed-off adjusting device at the time that the pressure of the hydraulic pump is stabilized at a predetermined pressure.

According to the present invention configured as described above, it is possible to measure the pressure of the hydraulic pump while changing the operation amount of the bleed-off adjusting device in a state in which the flow rate of the hydraulic pump is maintained, and calculate the leakage flow rate of the hydraulic pump on the basis of the control command value for the bleed-off adjusting device at the time that the pressure of the hydraulic pump is stabilized at the predetermined pressure. It is thus possible to measure a minute leakage flow rate of the hydraulic pump.

Advantages of the Invention

The construction machine according to the present invention makes it possible to measure a minute leakage flow rate of the one-sided tilting variable displacement hydraulic pump.

MODES FOR CARRYING OUT THE INVENTION

Figure 1:
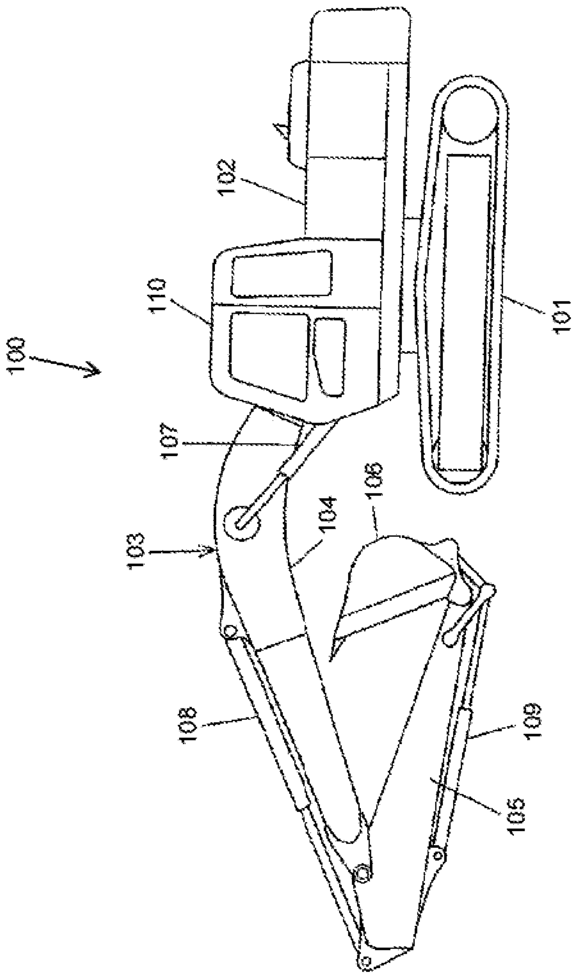
FIG. 1 is a side elevational view of a hydraulic excavator according to a first embodiment of the present invention.

As an example of a construction machine according to embodiments of the present invention, a hydraulic excavator will be described hereinbelow with reference to the drawings. Note that, in the drawings, identical components are denoted by identical reference characters, and their redundant description will appropriately be omitted below.

First Embodiment

FIG. 1 is a side elevational view of a hydraulic excavator according to a first embodiment of the present invention.

In FIG. 1, the hydraulic excavator, which is denoted by 100, includes a track structure 101, a swing structure 102 that is swingably mounted on the track structure 101, and a work implement 103 that is mounted pivotably in a vertical direction on a front side of the swing structure 102.

The work implement 103 includes a boom 104 that is mounted pivotably in a vertical direction on the front side of the swing structure 102, an arm 105 that is mounted pivotably in a vertical or longitudinal direction on a distal end portion of the boom 104, and a bucket 106 that is mounted pivotably in a vertical or longitudinal direction on a distal end portion of the arm 105. The boom 104 is driven by boom cylinders 107 that are hydraulic actuators, the arm 105 is driven by an arm cylinder 108 that is a hydraulic actuator, and the bucket 106 is driven by a bucket cylinder 109 that is a hydraulic actuator. A cabin 110 to be occupied by the operator is mounted on the swing structure 102 at a front position thereon.

Figure 2:
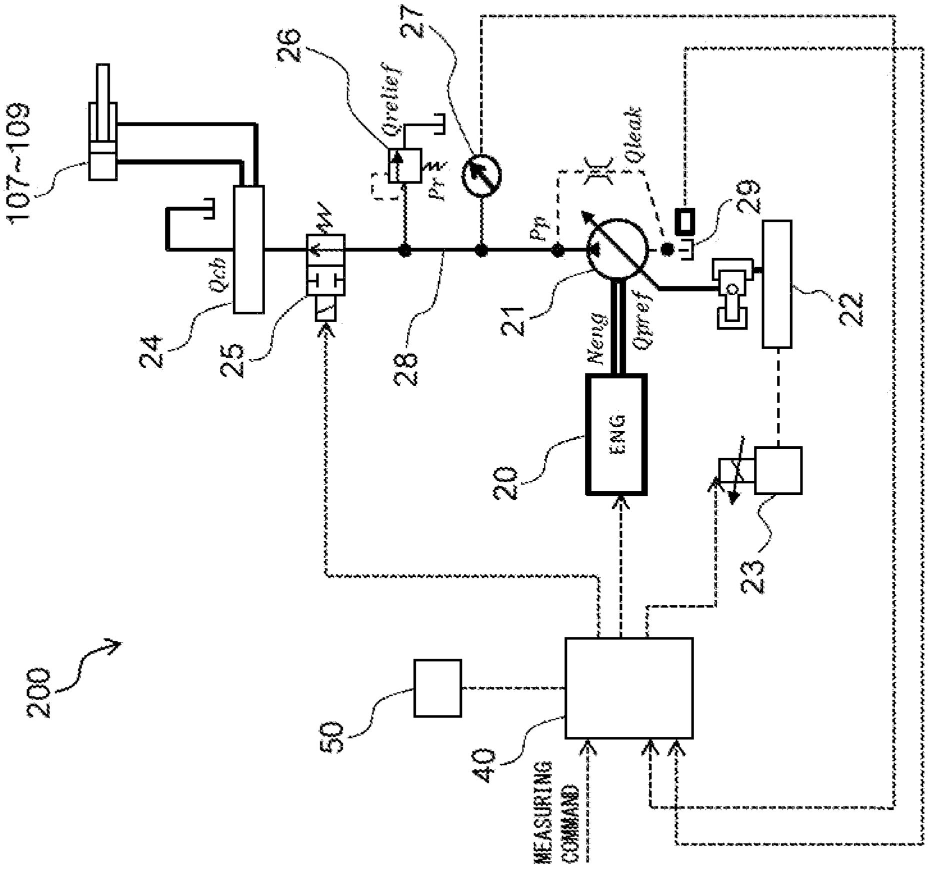
FIG. 2 is a schematic configurational diagram of a hydraulic drive system mounted on the hydraulic excavator illustrated in FIG. 1.

FIG. 2 schematically illustrates the configuration of a hydraulic drive system mounted on the hydraulic excavator 100.

As illustrated in FIG. 2, the hydraulic drive system, which is denoted by 200, includes an engine 20 as a prime mover, a one-sided tilting variable displacement hydraulic pump 21 that is driven by the engine 20, a hydraulic-pressure-pilot-type tilting control device 22 that controls a pump displacement volume (pump tilting) qp of the hydraulic pump 21, a solenoid proportional valve 23 that applies, to the tilting control device 22, a pilot pressure generated by reducing the primary pressure from a pilot hydraulic fluid source (not illustrated), the hydraulic actuators 107 to 109, an operation device 51 that gives an instruction for operations of the hydraulic actuators 107 to 109, a directional control valve unit 24, a bleed-off valve 25, a relief valve 26, a pressure senor 27, a monitor 50, an input device 52 that gives an instruction for measurement of a leakage flow rate of the hydraulic pump 21, and a controller 40 that controls the engine 20, the solenoid proportional valve 23, the bleed-off valve 25, the monitor 50, etc. The controller 40 has an input interface 40*a* that receives signals as input from the various components, a computing device 40*b* that includes, for example, a central processing unit (CPU) and peripheral circuits thereof and that performs various computing operations according to predetermined programs, a storage device 40*c* that stores the programs and various types of data, and an output interface 40*d* that outputs control signals to the components.

The directional control valve unit 24 is connected to a delivery line (pump delivery line) 28 connected to a delivery port of the hydraulic pump 21, and controls the flows of a hydraulic fluid supplied from the hydraulic pump 21 to the hydraulic actuators 107 to 109, according to operating actions on the operation device 51.

The bleed-off valve 25 is disposed upstream of the directional control valve unit 24 with respect to the pump delivery line 28, and is opened and closed according to a valve control signal from the controller 40 to establish and interrupt fluid communication through the pump delivery line 28.

The relief valve 26 is a safety valve for limiting the pressure in the pump delivery line 28, and is disposed upstream of the bleed-off valve 25 with respect to the pump delivery line 28. When the pressure (=pump pressure Pp) in the pump delivery line 28 exceeds a predetermined pressure (relief setting pressure) Pr, the relief valve 26 is opened, discharging the hydraulic fluid from the pump delivery line 28 into a tank 29.

The pressure sensor 27 is disposed upstream of the bleed-off valve 25 with respect to the pump delivery line 28. The pressure sensor 27 converts the pressure (=pump pressure Pp) in the pump delivery line 28 into a pressure signal, and outputs the pressure signal to the controller 40.

The controller 40 controls the bleed-off valve 25, a revolution speed (engine speed) Neng of the engine 20, and the pump tilting qp in response to a measuring command from the input device 52. On the basis of the pump pressure Pp detected by the pressure sensor 27, the controller 40 calculates a leakage flow rate Qleak of the hydraulic pump 21, and stores the calculated leakage flow rate Qleak in the storage device 40*c* or outputs the calculated leakage flow rate Qleak to the monitor 50, etc.

Axial piston type hydraulic pumps are widely used on construction machines, and their variable displacement mechanisms include a bent axis type and a swash plate type. Both types achieve variable displacement by changing piston strokes to change the displacement volume.

Figure 3:
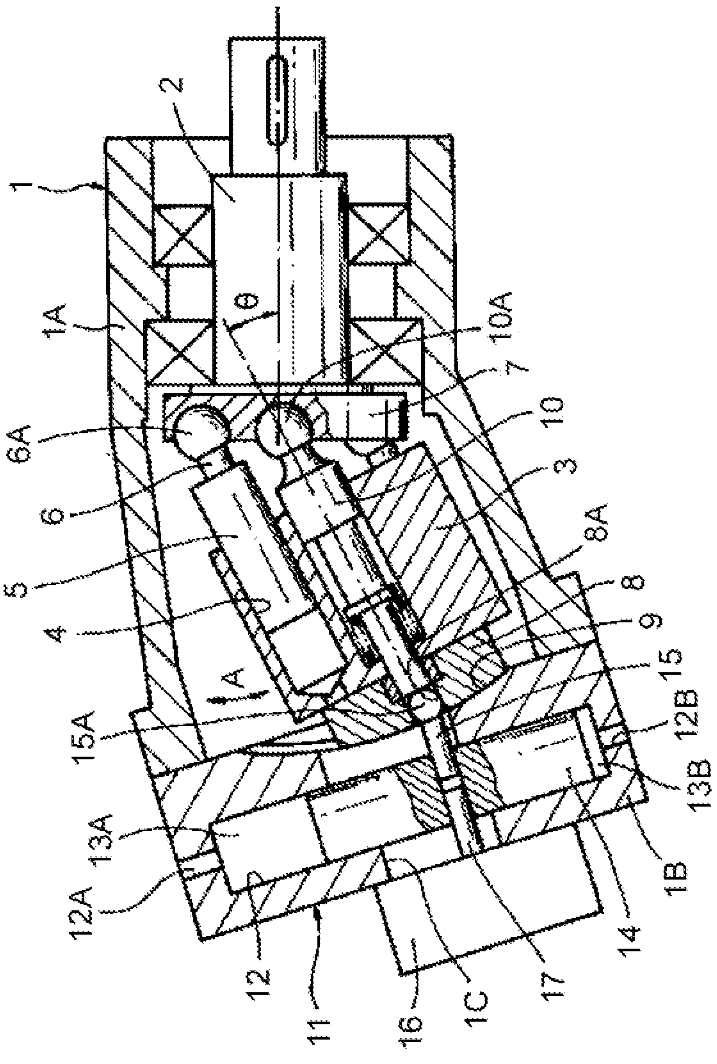
FIG. 3 is a structural view of a variable displacement bent-axis hydraulic pump.

FIG. 3 illustrates the structure of a variable displacement bent-axis hydraulic pump as an example of the one-sided tilting variable displacement hydraulic pump 21.

As illustrated in FIG. 3, a tubular casing 1 includes a substantially hollow cylindrical casing body 1A having a bearing portion on one end and a head casing 1B closing the other end of the casing body 1A.

A rotational shaft 2 is rotatably mounted in the casing body 1A. A cylinder block 3 is positioned within the casing body 1A and corotates with the rotational shaft 2. The cylinder block 3 has a plurality of cylinders 4 defined therein along axial directions thereof. Pistons 5 are slidably housed in the respective cylinders 4. Connecting rods 6 are attached to the respective pistons 5.

Spherical portions 6A are mounted on the respective distal ends of the connecting rods 6 and are swingably supported on a drive disk 7 mounted on the distal end of the rotational shaft 2. The cylinder block 3, together with a valve plate 8 to be described later, are disposed at a tilting angle θ as a tilting amount with respect to the rotational shaft 2. A pump displacement volume is determined depending on the tilting angle θ.

The cylinder block 3 is held in sliding contact with one side end face of the valve plate 8, and the other side end face of the valve plate 8 is held in sliding contact with a tilting slide surface 9 that is curved in a recessed manner and that is formed on the head casing 1B.

The valve plate 8 has a through hole 8A defined centrally therein, and the distal ends of a central shaft 10 and a swing pin 15, which are to be described later, are inserted into the through hole 8A from the respective sides of the valve plate 8. The valve plate 8 also has a pair of supply and discharge ports (not illustrated) that are intermittently brought into fluid communication with the cylinders 4 when the cylinder block 3 is rotated. The head casing 1B has a pair of supply and discharge passages (not illustrated) that are defined therein and that are opened at the tilting slide surface 9. The supply and discharge passages are kept in fluid communication with the supply and discharge ports regardless of the tilting position (tilting angle θ) of the valve plate 8.

The central shaft 10 supports the cylinder block 3 thereon between the drive disk 7 and the valve plate 8. A spherical portion 10A is mounted on an end of the central shaft 10 and is swingably supported on the drive disk 7 at a central axial position thereon. The opposite end of the central shaft 10 protrudes centrally through the cylinder block 3 and is slidably inserted into the through hole 8A in the valve plate 8 to center the cylinder block 3 with respect to the valve plate 8.

A tilting mechanism 11 tilts the valve plate 8 along the tilting slide surface 9. The tilting mechanism 11 includes a cylinder chamber 12 that is defined in the head casing 1B and that has fluid passage holes 12A and 12B defined at axially opposite ends of the cylinder chamber 12, a servo piston 14 that is slidably fitted in the cylinder chamber 12 and that defines fluid pressure compartments 13A and 13B in the cylinder chamber 12, and a swing pin 15 that has a proximal end portion fixed to the servo piston 14 and a distal end portion including a spherical distal end 15A which is swingably inserted through the through hole 8A in the valve plate 8.

A control unit 16 controls the tilting mechanism 11 to tilt the valve plate 8. The control unit 16 is disposed outside of the head casing 1B and includes a restriction control valve (not illustrated) for performing feedback control on the amount of a hydraulic fluid (pilot pressure) supplied from and discharged to a pilot pump (not illustrated). The restriction control valve includes a sleeve (not illustrated) integrally coupled to the servo piston 14 by a feedback pin 17 inserted through an oblong hole 1C defined in the head casing 1B.

When the restriction control valve of the control unit 16 is controlled by the operation lever 51 or the like, a hydraulic fluid (pilot pressure) depending on the degree to which the operation device 51 is operated is supplied from the pilot pump to, and discharged to the pilot pump from, the fluid pressure compartments 13A and 13B in the tilting mechanism 11 through the fluid passage holes 12A and 12B, slidingly displacing the servo piston 14 under the pressure difference between the fluid pressure compartments 13A and 13B. The servo piston 14 thus slidingly displaced in the cylinder chamber 12 causes the swing pin 15 to tilt the valve plate 8 and the cylinder block 3 in one of the directions indicated by an arrow A, by the tilting angle θ. The sleeve of the restriction control valve is displaced in unison with the servo piston 14, performing feedback control on the amount of the hydraulic fluid from the pilot pump to keep the servo piston 14 displaced to a state corresponding to the degree to which the restriction control valve is controlled.

The axial piston type variable displacement hydraulic pump thus constructed is capable of varying the flow rate of the hydraulic fluid delivered therefrom, by changing the angle to which the bent axis is tilted or by changing the tilting amount (tilting) of the swash plate when a swash-plate pump is used, thereby changing the displacement volume of the piston per revolution thereof.

Next, a pump delivery leakage will be described below.

As described above, major movable and slidable parts of the hydraulic pump include sliding surfaces of the bearings, sliding surfaces of the pistons 5 and the cylinders 4, sliding surfaces of the cylinder block 3 and the valve plate 8, sliding surfaces of the valve plate 8 and the head casing 1B, etc. The hydraulic fluid to be delivered from the hydraulic pump flows from the cylinder block 3 through the valve plate 8 to a delivery port (not illustrated). If the sliding surfaces are not well lubricated, they wear when sliding, tending to increase the gaps between the tilting slide surfaces. When the gaps are increased until the clearance between the movable and slidable components exceeds a predetermined normal clearance level, the hydraulic fluid to be delivered from the hydraulic pump flows (leaks) from the gaps into lower-pressure regions. As a result, the flow rate of the hydraulic fluid delivered from the hydraulic pump becomes smaller than a normal delivery flow rate by the flow rate of the leaking hydraulic fluid.

The relation between a theoretical pump flow rate, a pump leakage flow rate, and a pump pressure will be described below. The theoretical pump flow rate represents a pump flow rate based on the assumption that the pump leakage flow rate is zero.

The relation between various flow rates in the hydraulic drive system 200 and the pump pressure Pp is expressed by the following equation.

[Math. 1]

$$\frac{dPp}{dt} = (Qpref - Qleak - Qrelief - Qcb) \times \frac{B}{V} \quad (1)$$

Qpref: theoretical pump flow rate
Qleak: pump leakage flow rate
Qrelief: relief flow rate
Qcb: central bypass flow rate (bleed-off flow rate)
B: modulus of volume elasticity
V: pump delivery region volume Note that the theoretical pump flow rate Qpref is expressed by the following equation.

[Math. 2]

$$Qpref=qp\times Neng \tag{2}$$

According to the present embodiment, since the pump pressure Pp is kept constant under the control of the bleed-off valve 25, the following equation is obtained from the equation (1).

[Math. 3]

$$0=Qpref-Qleak-Qrelief-Qcb \tag{3}$$

Further, as the pump leakage flow rate Qleak is measured while the relief valve 26 is closed (i.e., while the relief flow rate Qrelief is zero), the following equation is obtained from the equation (3).

[Math. 4]

$$Qleak=Qpref-Qcb \tag{4}$$

By applying the equation of the orifice to the central bypass flow rate Qcb in the equation (4), the following equation is obtained.

[Math. 5]

$$Qleak = Qpref - C\times Acb\sqrt{\frac{2\Delta P}{\rho}} \tag{5}$$

C: constant
Acb: bleed-off valve opening area
ΔP: pressure difference across the bleed-off valve
ρ: hydraulic fluid density In the equation (5), the pressure difference ΔP across the bleed-off valve is constant, and the working oil density ρ remains essentially unchanged. Therefore, the equation (5) may be simplified as follows.

[Math. 6]

$$Qleak=Qpref-K\times Acb \tag{6}$$

K: coefficient

According to the equation (6), it will be seen that the leakage flow rate Qleak of the hydraulic pump 21 can be calculated from the theoretical pump flow rate Qpref and the opening area Acb of the bleed-off valve 25. Further, by grasping a change in the opening area Acb while the theoretical pump flow rate Qpref is constant, it is possible to grasp a change in the leakage flow rate Qleak. Note that, as the storage device 40*c* of the controller 40 stores opening area characteristic data with respect to a control command value for the bleed-off valve 25, the opening area Acb can easily be determined from the control command value for the bleed-off valve 25. Moreover, since the leakage flow rate Qleak becomes a function of only the opening area Acb by making the theoretical pump flow rate Qpref constant, it is possible to calculate the leakage flow rate Qleak easily and accurately from the control command value for the bleed-off valve 25.

Figure 4:
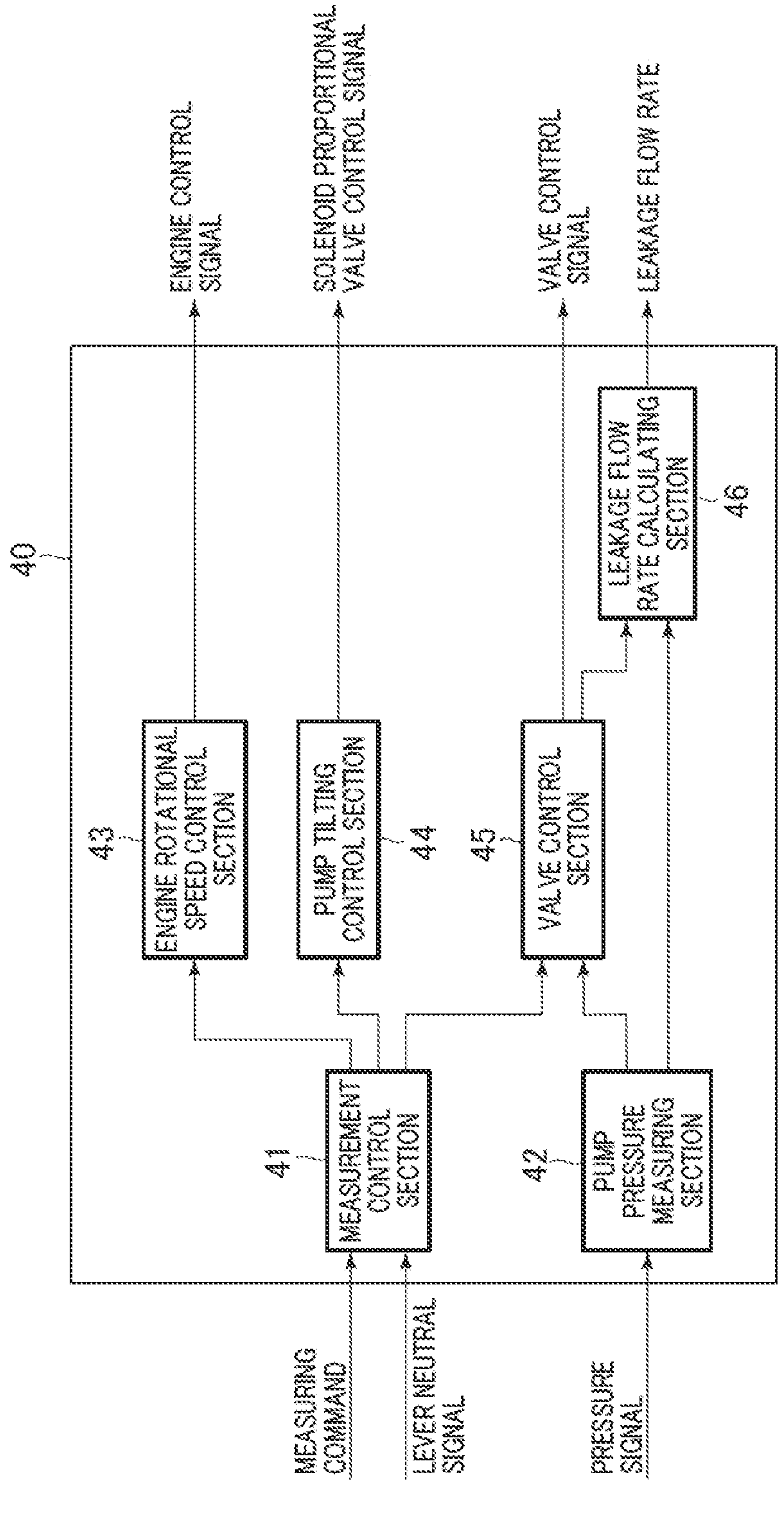
FIG. 4 is a functional block diagram of a controller illustrated in FIG. 3.

FIG. 4 illustrates functional blocks of the controller 40. Note that, in FIG. 4, only a configuration for measuring the leakage flow rate across the hydraulic pump 21 is illustrated, and a configuration for driving the actuators 107 to 109 is omitted from illustration.

In FIG. 4, the controller 40 includes a measurement control section 41, a pump pressure measuring section 42, an engine speed control section 43, a pump tilting control section 44, a valve control section 45, and a leakage flow rate calculating section 46.

The measurement control section 41 controls the engine speed control section 43, the pump tilting control section 44, and the valve control section 45 in response to a measuring command for starting measuring the leakage flow rate Qleak and a lever neutral signal. The measuring command may be generated by operating the input device such as a switch 52 that is disposed in the cabin 110, or may automatically be generated immediately after the engine 20 of the hydraulic excavator 100 is started to power up the controller 40. In such a case, an electric power signal that is inputted from the power supply device (not illustrated) of the controller 40 corresponds to the measuring command. The lever neutral signal represents a signal generated when the actuators 107 to 109 are not operated, and is generated according to input signals from the operation lever 51 of the actuators 107 to 109.

The pump pressure measuring section 42 converts a pressure signal from the pressure sensor 27 into a pump pressure Pp of the hydraulic pump 21, and outputs the pump pressure Pp to the valve control section 45 and the leakage flow rate calculating section 46.

The engine speed control section 43 controls the engine 20 to make the engine speed Neng equal to a predetermined revolution speed (prescribed revolution speed), in response to a command from the measurement control section 41.

The pump tilting control section 44 adjusts the opening degree of the solenoid proportional valve 23 and drives the tilting control device 22 to make the tilting qp of the hydraulic pump 21 equal to a desired value, in response to a command from the measurement control section 41.

The valve control section 45 adjusts the amount of opening (degree of opening) of the bleed-off valve 25 to bring the pump pressure Pp into conformity with a predetermined target pressure and outputs the opening degree of the valve to the leakage flow rate calculating section 46, in response to a command from the measurement control section 41. The target pressure referred to herein is set to such a pressure that is relatively high (e.g., 30 MPa) but that is lower than the relief setting pressure Pr (e.g., 35 MPa).

The leakage flow rate calculating section 46 calculates the leakage flow rate Qleak on the basis of the opening degree of the valve at the time that the pump pressure Pp is in conformity with the target pressure, and outputs the calculated leakage flow rate Qleak to the monitor 50, etc., located in the cabin 110. Note that the leakage flow rate calculating section 46 may be arranged to indicate the leakage flow rate Qleak not only to the operator in the cabin 110, but also to a vehicle administrator, a service department, or the like.

Figure 5:
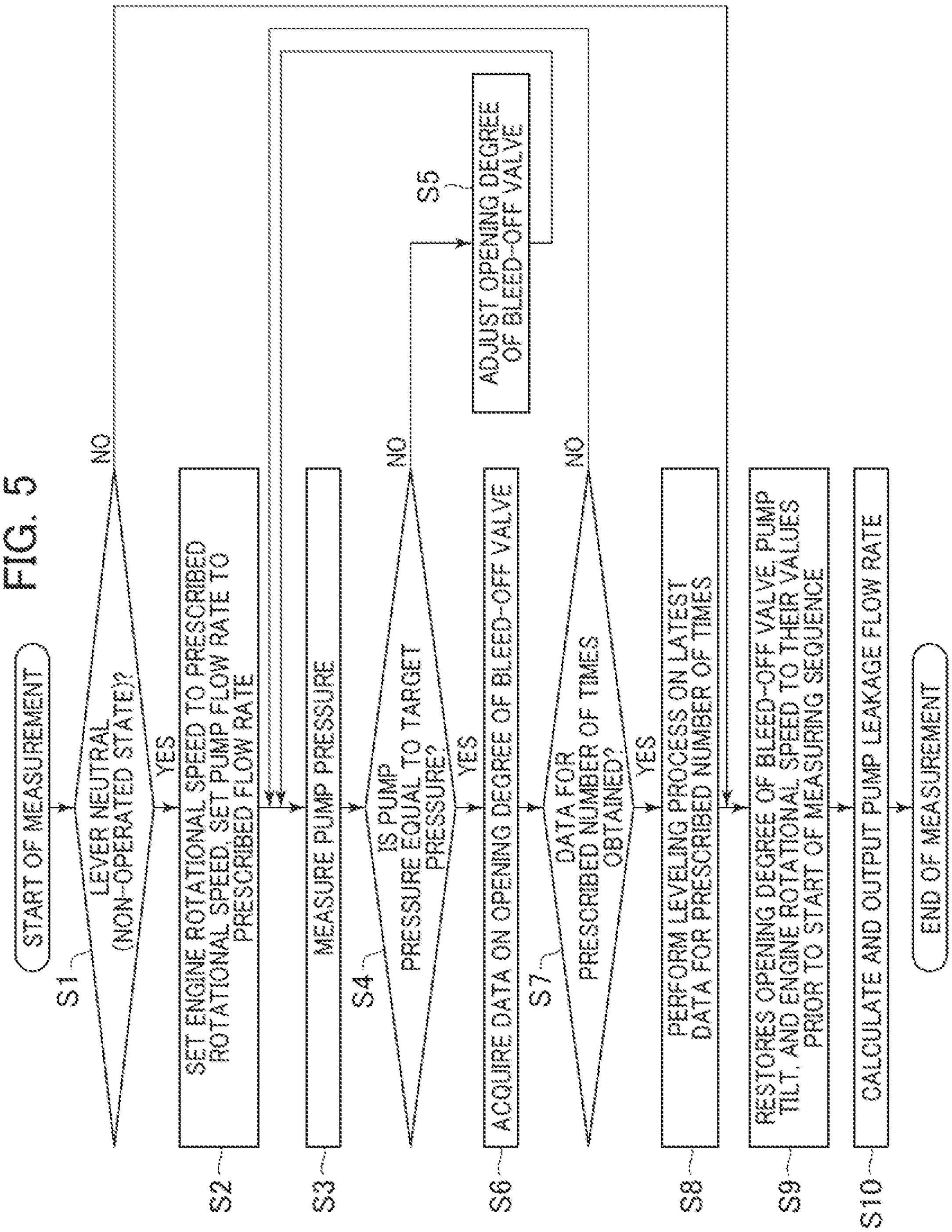
FIG. 5 is a flowchart of a process that is carried out by the controller illustrated in FIG. 3 to measure a pump leakage flow rate.

FIG. 5 is a flowchart of a sequence of measurement of a pump leakage flow rate that is carried out by the controller 40. In response to a command for measuring a pump leakage flow rate based on a request from the operator, the administrator, the service personnel, or the like, the controller 40 interrupts a normal control sequence (not illustrated) and changes to the measuring sequence. The steps of the measuring sequence will successively be described hereinbelow.

The controller 40 first determines whether or not the operation lever 51 is neutral (non-operated or not) (step S1).

If the controller 40 determines Yes (the operation lever 51 is neutral) in step S1, then the controller 40 sets the engine speed to the prescribed revolution speed and sets the delivery flow rate (pump flow rate) of the hydraulic pump 21*a* to a predetermined flow rate (prescribed flow rate).

After step S2, the controller 40 measures a pump pressure Pp (step S3).

After step S3, the controller 40 determines whether or not the pump pressure Pp is equal to a target pressure (step S4).

If the controller 40 determines No (the pump pressure Pp is not equal to the target pressure) in step S4, then the controller 40 adjusts the opening degree of the bleed-off valve 25 (step S5), and returns to step S3. Specifically, if the pump pressure Pp is lower than the target pressure, then the controller 40 corrects the degree of opening in a valve closing direction, and if the pump pressure Pp is higher than the target pressure, then the controller 40 corrects the degree of opening in a valve opening direction.

If the controller 40 determines Yes (the pump pressure Pp is equal to the target pressure) in step S4, then the controller 40 acquires data on the opening degree of the bleed-off valve (step S6).

After step S6, the controller 40 determines whether or not data for a prescribed number of times has been obtained (step S7). This is to secure a number of pieces of data enough to perform a subsequent leveling process such as a moving average process or a filtering process, in view of data variations, etc., and the prescribed number of times is established depending on the contents of the processing and the data acquisition rate.

If the controller 40 determines No (data for the prescribed number of times has not been obtained) in step S7, then the controller 40 returns to step S3.

If the controller 40 determines Yes (data for the prescribed number of times has been obtained) in step S7, then the controller 40 performs the leveling process on the latest data for the prescribed number of times (step S8).

After step S8, the controller 40 restores the opening degree Acb of the bleed-off valve, the pump tilting qp, and the engine speed Neng to their values prior to the start of the measuring sequence (step S9).

After step S9, the controller 40 calculates a pump leakage flow rate Qleak on the basis of the opening amount Acb of the bleed-off valve that is calculated in step S9 (step 10). Then, the measuring sequence is ended (the normal control sequence is reinstated).

According to the present embodiment, the construction machine 100 includes the prime mover 20, the tank 29 that stores the hydraulic fluid, the one-sided tilting variable displacement hydraulic pump 21 that is driven by the prime mover 20 and that delivers the hydraulic fluid drawn from the tank 29, the hydraulic actuators 107 to 109 that are driven by the hydraulic fluid supplied from the hydraulic pump 21, the operation device 51 that gives an instruction for operations of the hydraulic actuators 107 to 109, and the controller 40 that controls the engine speed Neng of the prime mover 20 and the tilt qp of the hydraulic pump 21. The construction machine 100 further includes the pressure sensor 27 that detects a pressure Pp of the hydraulic pump 21, the bleed-off adjusting device 25 that can adjust a bleed-off flow rate Qcb of the hydraulic pump 21, and the input device 52 that gives an instruction for measurement of the leakage flow rate Qleak of the hydraulic pump 21. The controller 40 is connected to the operation device 51, the pressure sensor 27, the bleed-off adjusting device 25, and the input device 52, and is programmed to determine an operated state of the operation device 51 on the basis of an input signal from the operation device 51, convert a detected signal from the pressure sensor 27 into a pressure value, and output a control signal based on a control command value to the bleed-off adjusting device 25. When the controller 40 determines that the operation device 51 is in a non-operated state and when a measuring command is inputted from the input device 52, the controller 40 measures a pressure Pp of the hydraulic pump 21 while changing the control command value for the bleed-off adjusting device 25 with the flow rate Qpref of the hydraulic pump 21 being maintained, and calculates a leakage flow rate Qleak of the hydraulic pump 21 on the basis of the control command value for the bleed-off adjusting device 25 at the time that the pressure Pp of the hydraulic pump 21 is stabilized at a predetermined pressure.

Further, when the controller 40 according to the present embodiment determines that the operation device 51 is in the non-operated state, on the basis of an input signal from the operation device 51, and when the measuring command is inputted from the input device 52, the controller 40 adjusts the flow rate of the hydraulic pump 21 to a predetermined flow rate, measures the pressure Pp of the hydraulic pump 21 while changing the control command value for the bleed-off adjusting device 25 with the flow rate of the hydraulic pump 21 being maintained at the predetermined flow rate, and calculates the leakage flow rate Qleak of the hydraulic pump 21 on the basis of the control command value for the bleed-off adjusting device 25 at the time that the pressure Pp of the hydraulic pump 21 is stabilized at the predetermined pressure.

According to the present embodiment as configured as described above, the pressure Pp of the hydraulic pump 21 can be measured while changing the control command value for the bleed-off adjusting device 25 with the leakage flow rate Qleak of the hydraulic pump 21 being maintained, and the leakage flow rate of the hydraulic pump 21 can be calculated on the basis of the control command value for the bleed-off adjusting device 25 at the time that the pressure Pp of the hydraulic pump 21 is stabilized at the predetermined pressure. Consequently, a minute leakage flow rate Qleak of the hydraulic pump 21 can be measured.

In addition, when the controller 40 according to the present embodiment determines that the operation device 51 is in the non-operated state, on the basis of an input signal from the operation device 51, and when the measuring command is inputted from the input device 52, the controller 40 may measure the pressure Pp of the hydraulic pump 21 while adjusting the control command value for the bleed-off adjusting device 25 with the present flow rate Qpref of the hydraulic pump 21 being maintained, and store the control command value for the bleed-off adjusting device 25 at the time that the pressure Pp of the hydraulic pump 21 is in conformity with the target pressure, in association with the pressure Pp and the present flow rate Qpref of the hydraulic pump 21. In this case, though the flow rate Qpref of the hydraulic pump 21 varies each time a leakage flow rate is measured, it is possible to grasp a change in the leakage flow rate Qleak by confirming a transition of the control command value for the bleed-off adjusting device 25 that is stored in association with the pressure Pp and the flow rate Qpref which are identical to each other or which are in the same range. Moreover, since the flow rate Qpref of the hydraulic pump 21 does not change before and after the leakage flow rate Qleak is measured, it is possible to reduce adverse effects on the operability after the measurement is finished.

Furthermore, the controller 40 according to the present embodiment performs a leveling process on the control command value for the bleed-off adjusting device 25 before calculating the leakage flow rate Qleak. As the leveling process removes the effect of noise, etc., from the control command value for the bleed-off adjusting device 25, it is possible to increase the accuracy with which to measure the leakage flow rate Qleak.

Figure 6:
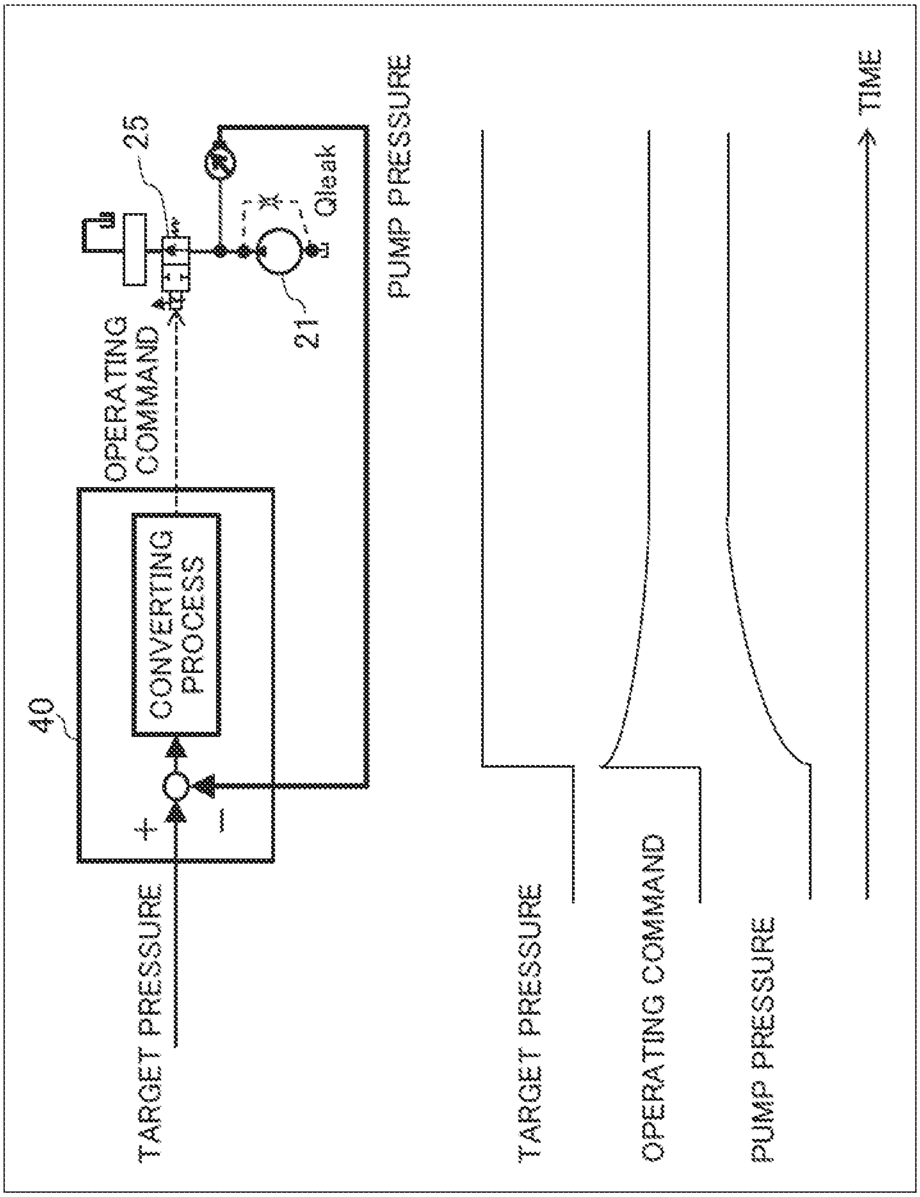
FIG. 6 is a diagram illustrating a control process for controlling a pump pressure by using a bleed-off valve.

An additional control process for controlling the pump pressure Pp by using the bleed-off valve 25 will be described below with reference to FIG. 6. While the present control process is being carried out, a target pressure is inputted as a command to the controller 40. The controller 40 calculates a pump pressure Pp from a pressure signal from the pressure sensor 27, calculates a control command value for the bleed-off valve 25 for making the pump pressure Pp equal to the target pressure, and outputs a valve control signal based on the control command value to the bleed-off valve 25. While the present control process is not being carried out, the controller 40 outputs an operation command for fully opening the bleed-off valve 25.

According to the present embodiment, the configuration for calculating the pump leakage flow rate Qleak on the construction machine side has been described above. Time information and the feature quantities (the control command value for the bleed-off valve 25, the pump leakage flow rate Qleak, etc.,) that are indicative of the degree of damage of the hydraulic pump 21 may be transferred to an analyzing server located in another site through communication means using satellite communications, and the analyzing server may perform a diagnostic process.

Figure 7:
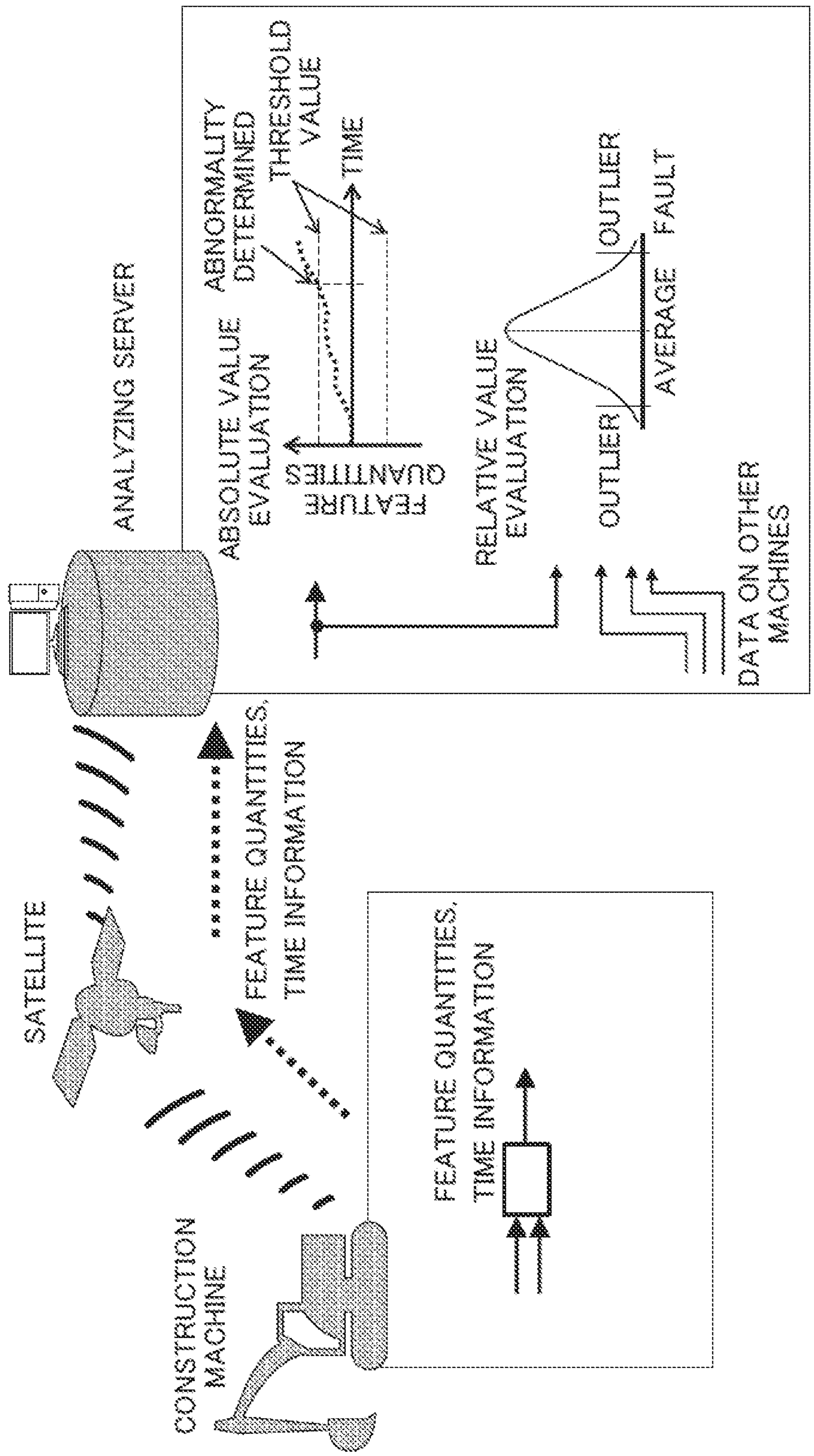
FIG. 7 is a diagram illustrating a configurational example in which an analyzing server performs a diagnostic process.

FIG. 7 illustrates a configurational example in which an analyzing server performs a diagnostic process. In this example, a threshold value for determining a fault may easily be changed by the analyzing server. Moreover, as not only data on one machine but also data on a number of machines to be compared (machines of the same kind, class, etc.,) can be collected, a determining threshold value may be decided by comparing relative values representing deviations or departures from a population. In such a case, simpler designs can be achieved because a determining threshold value does not need to be decided in advance but is decided through its adjustment while in operation.

Inasmuch as symptoms of a fault of the pump can be diagnosed on the basis of the determining threshold value that has been defined on the basis of the feature quantities and time information and its tendency over time, the symptoms of the fault of the pump can be grasped outside the construction machine.

Embodiment 2

A second embodiment of the present invention will be described below mainly with respect to its features where it is different from the first embodiment.

According to the first embodiment, since the bleed-off valve 25 is positioned immediately downstream of the hydraulic pump 21, a leakage flow rate of the hydraulic pump 21 can be measured without being adversely affected by the directional control valve unit 24, etc. However, with the construction machine 100 whose actuators 107 to 109 are driven by the hydraulic fluid delivered from the hydraulic pump 21, there is a situation where it is preferable to evaluate a leakage across not only the hydraulic pump 21 but also the directional control valve unit 24, because not only the hydraulic pump 21 but also the directional control valve unit 24 are largely involved in supplying the hydraulic fluid to the hydraulic actuators 107 to 109.

Figure 8:
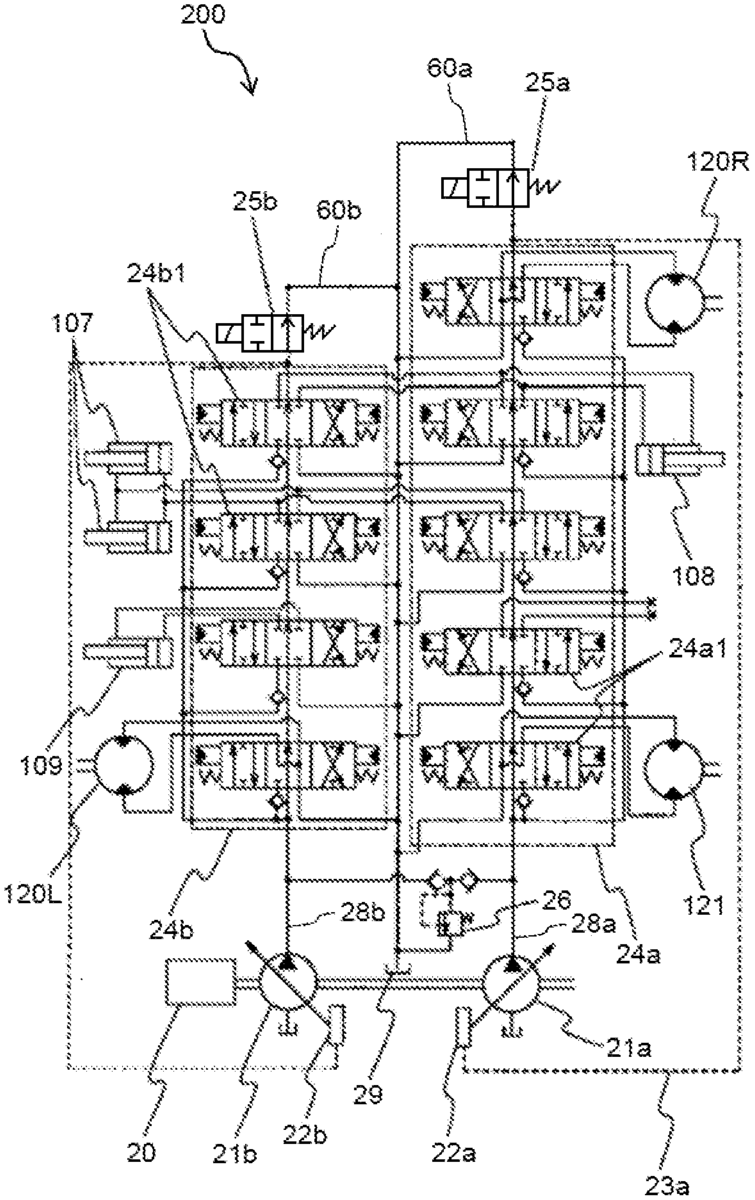
FIG. 8 is a circuit diagram of a hydraulic drive system according to a second embodiment of the present invention.

As illustrated in FIG. 8, the hydraulic drive system 200 includes variable displacement first and second hydraulic pumps 21*a* and 21*b* that are driven by the engine (prime mover) 20, a first directional control valve unit 24*a* that includes a plurality of directional control valves 24*a*1 parallel-connected to a pump delivery line 28*a* of the first hydraulic pump 21*a*, and a second directional control valve unit 24*b* that includes a plurality of directional control valves 24*b*1 parallel-connected to a pump delivery line 28*b* of the second hydraulic pump 21*b*.

The directional control valves 24*a*1 of the first directional control valve unit 24*a* and the directional control valves 24*b*1 of the second directional control valve unit 24*b* are each connected to any one of the hydraulic actuators 107 to 109 and hydraulic actuators 120L, 120R, and 121. Each of the directional control valves 24*a*1 and the directional control valves 24*b*1 has its spool shiftable by a pilot pressure (hydraulic or electromagnetic) controlled by the operation lever 51 located in the cabin 110 or the operation device 51 such as an operating pedal. First and second bleed-off valves 25*a* and 25*b* are connected respectively to bypass lines 60*a* and 60*b* that allow the hydraulic fluid from the first and second hydraulic pumps 21*a* and 21*b* to flow into the tank 29. The first and second bleed-off valves 25*a* and 25*b* control flow rates (bleed-off flow rates) of the hydraulic fluid flowing from the first and second hydraulic pumps 21*a* and 21*b* into the tank 29, according to commands from the controller 40 (illustrated FIG. 4).

The hydraulic actuators mounted on the hydraulic excavator 100 include left and right track motors 120R and 120L and a swing motor 121, each including a hydraulic motor, the boom cylinders 107 for driving the boom 104, the arm cylinder 108 for driving the arm 105, and the bucket cylinder 109 for driving the bucket 106. Of these hydraulic actuators, the boom cylinders 107 and the arm cylinder 108 are supplied with the combined hydraulic fluid from the first and second hydraulic pumps 21*a* and 21*b*. Note that, though the hydraulic drive system 200 according to the present embodiment has the two hydraulic pumps 21*a* and 21*b*, the number of hydraulic pumps used may be varied, if necessary, depending on the work load, etc.

The relief valve 26 that restricts the maximum pressure of a hydraulic circuit is disposed between the first and second hydraulic pumps 21*a* and 21*b* and the tank 29, and thus, protection of the respective components included in the hydraulic circuit is achieved.

The present embodiment is different from the first embodiment in that it includes the bleed-off valves 25*a* and 25*b* disposed downstream of the directional control valve units 24*a* and 24*b*, instead of the bleed-off valve 25 (illustrated in FIG. 2) disposed upstream of the directional control valve unit 24. As illustrated in FIG. 8, the directional control valves 24*a*1 and 24*b*1 for controlling the flow of the hydraulic fluid supplied to the actuators are connected parallel to the supply ports of the pumps, and leakages of the hydraulic fluid from the directional control valves 24*a*1 and 24*b*1, as well as leakages from the pumps, adversely affect the driving of the actuators.

The relation between various flow rates in the hydraulic drive system 200 and the pump pressure Pp is expressed by the following equation.

[Math. 7]

$$\frac{dPp}{dt} = (Qpref - Qleak - Qrelief - Qcb - Qcv) \times \frac{B}{V} \quad (7)$$

Qpref: theoretical pump flow rate
Qleak: pump leakage flow rate
Qrelief: relief flow rate
Qcb: central bypass flow rate (bleed-off flow rate)
Qcv: directional control valve leakage flow rate
B: modulus of volume elasticity
V: pump delivery region volume Moreover, since the pump leakage flow rate Qleak is measured in a state in which the pump pressure Pp is kept constant under the control of the bleed-off valve 25 and in which the relief valve 26 is closed (i.e., the relief flow rate Qrelief is zero), the following equation is obtained from the equation (7).

[Math. 8]

$$Q\text{leak}+Qcv=Q\text{pref}-K\times Ach \quad (8)$$

According to the equation (8), since the sum of the pump leakage flow rate Qleak and the directional control valve leakage flow rate Qcv is calculated, it is possible to measure a leakage flow rate of the entire hydraulic fluid supply system including the hydraulic pumps 21*a* and 21*b* and the directional control valve units 24*a* and 24*b*.

Operation of the hydraulic drive system at the time of measuring a pump leakage flow rate is the same as that according to the first embodiment, and will be omitted from description. As the hydraulic drive system operates as described above, the leakage flow rate of the entire hydraulic fluid supply system can be measured from a minute leakage flow rate range, and can be measured highly accurately through the theoretical pump flow rate Qpref at the time that the pump pressure Pp gradually exceeds the target pressure (e.g., 30 MPa) in a state in which the bleed-off flow rate Qcb is zero and in which the relief flow rate Qrelief is zero. It is thus possible to evaluate the degree of damage of the supply source of the hydraulic fluid of the construction machine.

The bleed-off adjusting devices 25*a* and 25*b* according to the present embodiment are the bleed-off valves 25*a* and 25*b* that are connected respectively to the bypass lines 60*a* and 60*b* interconnecting the directional control valve units 24*a* and 24*b* and the tank 29 and that can be opened and closed according to valve control signals from the controller 40.

According to the present embodiment configured as described above, it is possible to measure a minute leakage flow rate of the entire hydraulic fluid supply system including the hydraulic pumps 21*a* and 21*b* and the directional control valve units 24*a* and 24*b*.

Embodiment 3

A third embodiment of the present invention will be described below mainly with respect to its features where it is different from the first embodiment.

The present embodiment has, as its object, the provision of a method of evaluating and diagnosing a leakage flow rate when the evaluation and comparison of measurement results is inappropriate in situations that are widely different from normal measuring environments. In a specific example, the hydraulic fluid may have an extremely low temperature of −20° C. in a diagnosis carried out in a severely cold situation in a highly cold climate. In this case, since a leakage flow rate through an annular gap in a pump is generally affected by the viscosity of the hydraulic fluid, it is expected that the temperature environment will affect the way in which the hydraulic fluid leaks. In situations where the hydraulic fluid has different temperatures depending on whether or not it is warmed up, it is not suitable to quantitatively evaluate a leakage flow rate calculated according to the first embodiment. According to the present embodiment, there will be described a method of calculating a leakage flow rate suitable for evaluation in widely different measuring environments.

As indicated by the hydraulic circuit arrangement illustrated in FIG. 8, since the construction machine such as a hydraulic excavator has the left and right track motors 120L and 120R, it is normal for the construction machine to have two hydraulic pumps of the same specifications in order to obtain equivalence between the left and right systems. Providing the two hydraulic pumps 21*a* and 21*b* are free of damage and have similar leakage flow rate characteristics, the two hydraulic pumps 21*a* and 21*b* should have equal leakage flow rates even if an environment such as temperature is widely different from its normal level. Conversely, if the leakage flow rates of the two hydraulic pumps 21*a* and 21*b* are widely different from each other, then the hydraulic pump with the larger leakage flow rate can be recognized as being more damaged than the other hydraulic pump.

Therefore, when a temperature environment is widely different from its normal level, the effect of the change in the temperature environment on each of the leakage flow rates can be reduced for a more appropriate leakage diagnosis, by adding the effect of deviations of the leakage flow rates of the two hydraulic pumps in calculating the leakage flow rates of the two hydraulic pumps.

Figure 9:
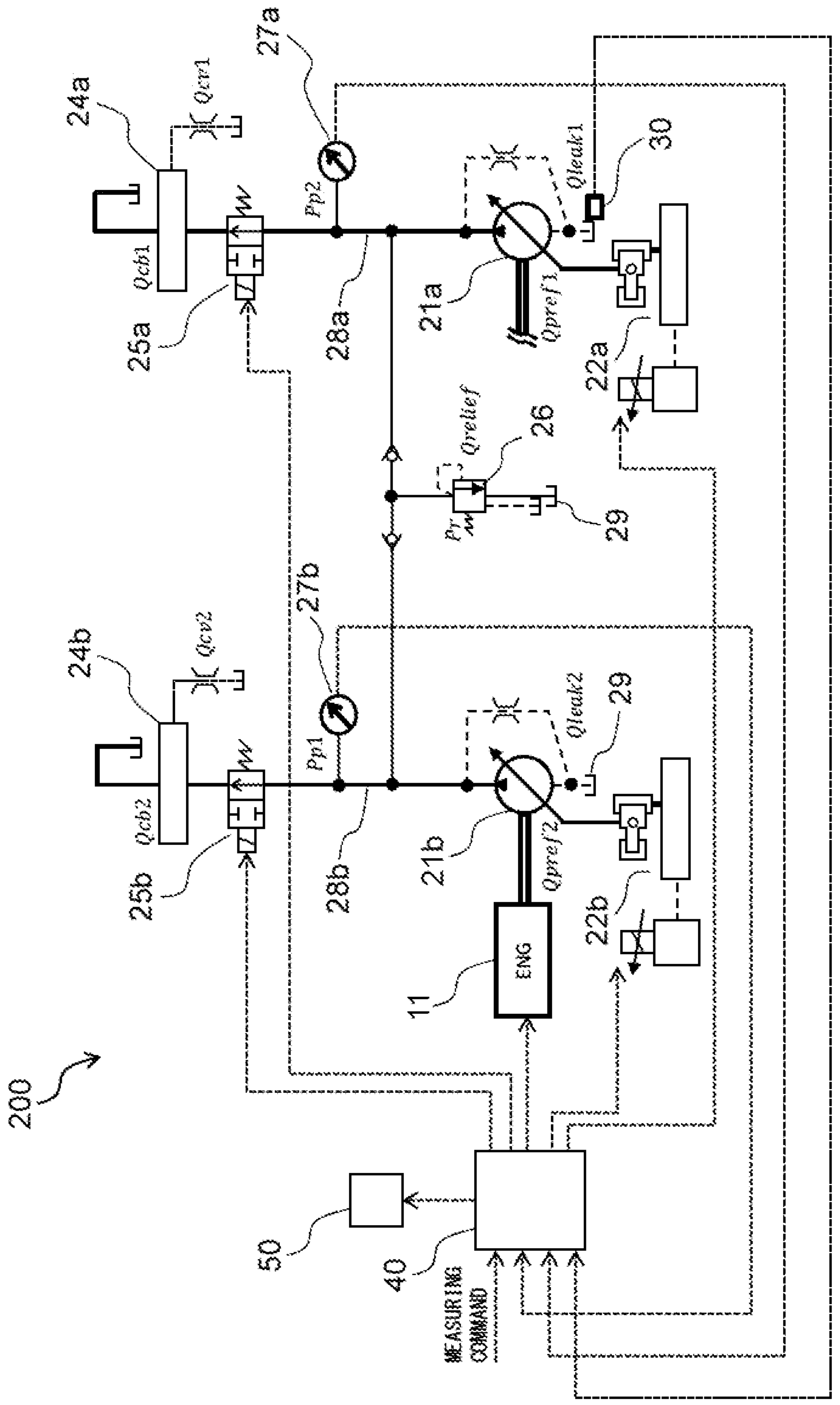
FIG. 9 is a schematic configurational diagram of a hydraulic drive system according to a third embodiment of the present invention.
Figure 10:
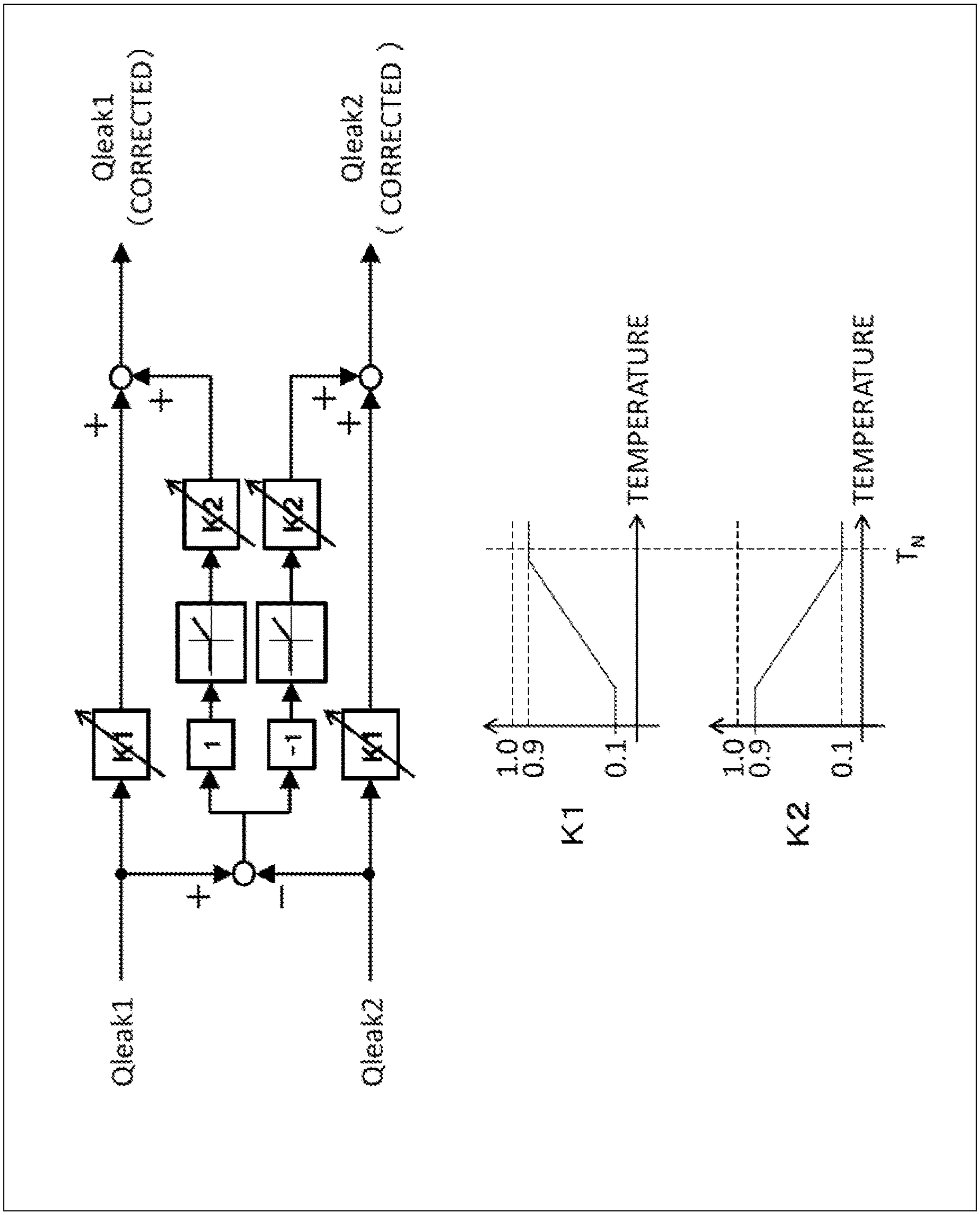
FIG. 10 is a diagram illustrating a process for correcting pump leakage flow rates according to the third embodiment of the present invention.

FIG. 9 illustrates the general configuration of a hydraulic drive system 200 according to the present embodiment, and FIG. 10 illustrates a process for correcting leakage flow rates Qleak1 and Qleak2 of the hydraulic pumps 21*a* and 21*b* according to the present embodiment. Note that the process of calculating the leakage flow rates Qleak1 and Qleak2 of the hydraulic pumps 21*a* and 21*b* has been described in the first embodiment.

In the example illustrated in FIG. 8, a weighted mean of the leakage flow rate Qleak1 and the absolute value of the deviation (=Qleak1−Qleak2) between the leakage flow rates Qleak1 and Qleak2 is calculated as a corrected leakage flow rate Qleak1, and a weighted mean of the leakage flow rate Qleak2 and the absolute value of the difference (=Qleak2−Qleak1) between the leakage flow rates Qleak2 and Qleak1 is calculated as a corrected leakage flow rate Qleak2 of the hydraulic pump 21*a*.

A coefficient K1 for determining the specific weights of the leakage flow rates Qleak1 and Qleak2 and a coefficient K2 for determining the specific weight of the absolute value of the deviation between the leakage flow rates Qleak1 and Qleak2 are established in such a manner that the condition of K1+K2=1 is satisfied, that the coefficient K1 is dominant (e.g., 0.9) at a standard temperature TN, and that the coefficient K2 becomes more dominant (e.g., 0.9) as the temperature drops.

The hydraulic excavator 100 according to the present embodiment further includes a one-sided tilting variable displacement second hydraulic pump 21*b* that is driven by the prime mover 20 and that delivers the hydraulic fluid drawn from the tank 29, a second pressure sensor 27*b* that detects a pressure Pp2 of the second hydraulic pump 21*b*, a second bleed-off adjusting device 25*b* that is capable of adjusting a bleed-off flow rate Qcb2 of the second hydraulic pump 21*b*, and a temperature sensor 30 that detects the temperature of the hydraulic fluid. The hydraulic actuators 107 to 109 can be driven by the hydraulic fluid supplied from the second hydraulic pump 21*b*. The controller 40 is connected to the second pressure sensor 27*b*, the second bleed-off adjusting device 25*b*, and the temperature sensor 30. The controller 40 is programmed to convert a detected signal from the second pressure sensor 27*b* into a pressure value, output a control signal based on a control command value to the second bleed-off adjusting device 25*b*, and convert a detected signal from the temperature sensor 30 into a temperature value. When the controller 40 determines that the operation device 51 is in a non-operated state and when a measuring command is inputted from the input device 52, the controller 40 measures a pressure Pp2 of the second hydraulic pump 21*b* while changing the control command value for the second bleed-off adjusting device 25*b* with the flow rate of the second hydraulic pump 21*b* being maintained, calculates the leakage flow rate Qleak2 of the second hydraulic pump 21*b* on the basis of the control command value for the second bleed-off adjusting device 25*b* at the time that the pressure Pp2 of the second hydraulic pump 21*b* is stabilized at a predetermined pressure, and corrects the leakage flow rate Qleak1 of the first hydraulic pump 21*a* and the leakage flow rate Qleak2 of the second hydraulic pump 21*b* depending on the temperature of the hydraulic fluid.

According to the present embodiment configured as described above, it is possible to perform an appropriate leakage diagnosis regardless of the temperature environment, by correcting the leakage flow rates Qleak1 and Qleak2 of the first and second hydraulic pumps 21*a* and 21*b* depending on the temperature of the hydraulic fluid.

Although the embodiments of the present invention have been described in detail above, the present invention is not limited to the above embodiments and includes various modifications. For example, the above embodiments have been described in detail for an easier understanding of the present invention, and may not necessarily include all the details and features described above. Moreover, it is possible to add one or some parts of one or more of the embodiments to another embodiment or other embodiments, and to delete or replace one or some parts of one or more of the embodiments with one or some parts of another embodiment or other embodiments.

DESCRIPTION OF REFERENCE CHARACTERS

1: Casing
1A: Casing body
1B: Head casing
1C: Oblong hole
2: Rotational shaft
3: Cylinder block
4: Cylinder
5: Piston
6: Connecting rod
6A: Spherical portion
7: Drive disk
8: Valve plate
8A: Through hole
9: Tilting slide surface
10: Central shaft
11: Tilting mechanism
12: Cylinder chamber
12A, 12B: Fluid passage hole
13A, 13B: Fluid pressure compartment
14: Servo piston
15: Swing pin
15A: Spherical distal end
16: Control unit
17: Feedback pin
20: Engine (prime mover)
21: Hydraulic pump (first hydraulic pump)
21*a*: Hydraulic pump (first hydraulic pump)
21*b*: Hydraulic pump (second hydraulic pump)
22, 22*a*, 22*b*: Tilting control device
23: Solenoid proportional valve
24, 24*a*: Directional control valve unit (first directional control valve unit)
24*b*: Directional control valve unit (second directional control valve unit)
25, 25*a*: Bleed-off valve (first bleed-off adjusting device)
25*b*: Bleed-off valve (second bleed-off adjusting device)
26: Relief valve
27, 27*a*: Pressure sensor (first pressure sensor)
27*b*: Pressure sensor (second pressure sensor)
28, 28*a*, 28*b*: Pump delivery line
29: Tank
30: Temperature sensor
40: Controller
41: Measurement control section
42: Pump pressure measuring section
43: Engine speed control section
44: Pump tilting control section
45: Valve control section
46: Leakage flow rate calculating section
50: Monitor
51: Operation lever (operation device)
52: Switch (input device)
60*a*, 60*b*: Bypass line
100: Hydraulic excavator (construction machine)
101: Track structure
102: Swing structure
103: Work implement
104: Boom
105: Arm
106: Bucket
107: Boom cylinder (hydraulic actuator)
108: Arm cylinder (hydraulic actuator)
109: Bucket cylinder (hydraulic actuator)
110: Cabin
120L, 120R: Track motor (hydraulic actuator)
121: Swing motor (hydraulic actuator)
200: Hydraulic drive system

The invention claimed is:

1. A construction machine comprising: a prime mover; a tank that stores a hydraulic fluid; a one-sided tilting variable displacement first hydraulic pump that is driven by the prime mover and that delivers the hydraulic fluid drawn from the tank; a plurality of hydraulic actuators that are driven by the hydraulic fluid supplied from the first hydraulic pump; an operation device that gives an instruction for operations of the plurality of hydraulic actuators; and a controller that controls a revolution speed of the prime mover and tilting of the first hydraulic pump, wherein the construction machine further comprises a first pressure sensor that detects a pressure of the first hydraulic pump, a first bleed-off adjusting device that is enabled to adjust a bleed-off flow rate of the first hydraulic pump, and an input device that gives an instruction for measurement of a leakage flow rate of the first hydraulic pump, and the controller is connected to the operation device, the first pressure sensor, the first bleed-off adjusting device, and the input device, and is programmed to determine an operated state of the operation device on a basis of an input signal from the operation device, convert a detected signal from the first pressure sensor into a pressure value, and output a control signal based on a control command value to the first bleed-off adjusting device, and is configured to, in a case where the controller determines that the operation device is in a non-operated state and where a measuring command is inputted from the input device, measure a pressure of the first hydraulic pump while changing the control command value for the first bleed-off adjusting device in a state in which a flow rate of the first hydraulic pump is maintained, and calculate the leakage flow rate of the first hydraulic pump on a basis of the control command value for the first bleed-off adjusting device at a time that the pressure of the first hydraulic pump is stabilized at a predetermined pressure.

2. The construction machine according to claim 1, wherein the controller is configured to, in the case where the controller determines that the operation device is in the non-operated state and where the measuring command is inputted, adjust the flow rate of the first hydraulic pump to a predetermined flow rate, measure the pressure of the first hydraulic pump while changing the control command value for the first bleed-off adjusting device in a state in which the flow rate of the first hydraulic pump is maintained at the predetermined flow rate, and calculate the leakage flow rate of the first hydraulic pump on the basis of the control command value for the first bleed-off adjusting device at the time that the pressure of the first hydraulic pump is stabilized at the predetermined pressure.

3. The construction machine according to claim 1, wherein the controller is configured to, in the case where the controller determines that the operation device is in the non-operated state and where the measuring command is inputted, measure the pressure of the first hydraulic pump while changing the control command value for the first bleed-off adjusting device in a state in which a current flow rate of the first hydraulic pump is maintained, and store the control command value for the first bleed-off adjusting device at a time that the pressure of the first hydraulic pump is in conformity with the predetermined pressure, in association with the pressure and the current flow rate of the first hydraulic pump.

4. The construction machine according to claim 1, wherein the controller is further configured to perform a leveling process on the control command value for the first bleed-off adjusting device before calculating the leakage flow rate of the first hydraulic pump.

5. The construction machine according to claim 1, further comprising: a first directional control valve unit that controls a flow of the hydraulic fluid supplied from the first hydraulic pump to the plurality of hydraulic actuators, wherein the first bleed-off adjusting device is a bleed-off valve that is connected to a bypass line interconnecting the first directional control valve unit and the tank and that is opened and closed according to a valve control signal from the controller.

6. The construction machine according to claim 1, further comprising: a one-sided tilting variable displacement second hydraulic pump that is driven by the prime mover and that delivers the hydraulic fluid drawn from the tank; a second pressure sensor that detects a pressure of the second hydraulic pump; a second bleed-off adjusting device that is enabled to adjust a bleed-off flow rate of the second hydraulic pump; and a temperature sensor that detects a temperature of the hydraulic fluid, wherein the plurality of hydraulic actuators are enabled to be driven by the hydraulic fluid supplied from the second hydraulic pump, and the controller is further connected to the second pressure sensor, the second bleed-off adjusting device, and the temperature sensor, and is further programmed to convert a detected signal from the second pressure sensor into a pressure value, output a control signal based on a control command value to the second bleed-off adjusting device, and convert a detected signal from the temperature sensor into a temperature value, and is further configured to, in the case where the controller determines that the operation device is in the non-operated state and where the measuring command is inputted, measure a pressure of the second hydraulic pump while changing the control command value for the second bleed-off adjusting device in a state in which a flow rate of the second hydraulic pump is maintained, calculate a leakage flow rate of the second hydraulic pump on a basis of the control command value for the second bleed-off adjusting device at a time that the pressure of the second hydraulic pump is stabilized at the predetermined pressure, and correct the leakage flow rate of the first hydraulic pump and the leakage flow rate of the second hydraulic pump depending on the temperature of the hydraulic fluid.

* * * * *